Sept. 12, 1972     M. HAWERKAMP     3,690,993
APPARATUS FOR MAKING HELICAL-SEAM TUBING FROM
A SYNTHETIC-RESIN STRIP
Filed June 12, 1970     2 Sheets-Sheet 2
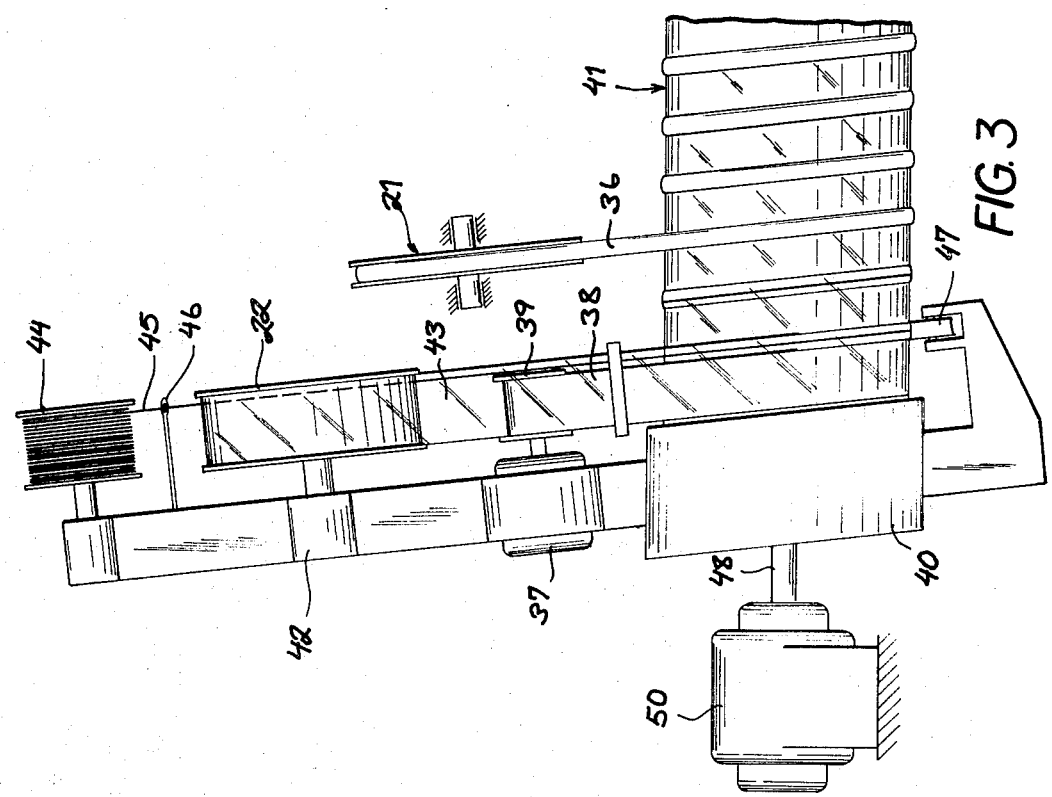
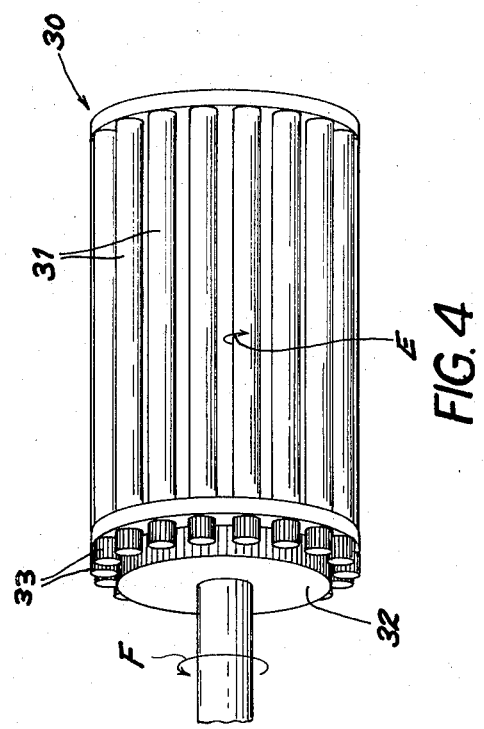
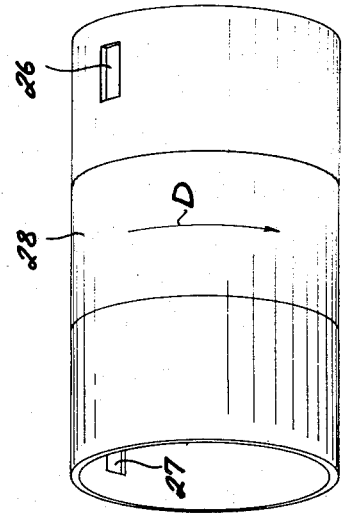
Manfred Hawerkamp
INVENTOR
BY
Karl F. Ross
Attorney United States Patent Office 3,690,993
Patented Sept. 12, 1972

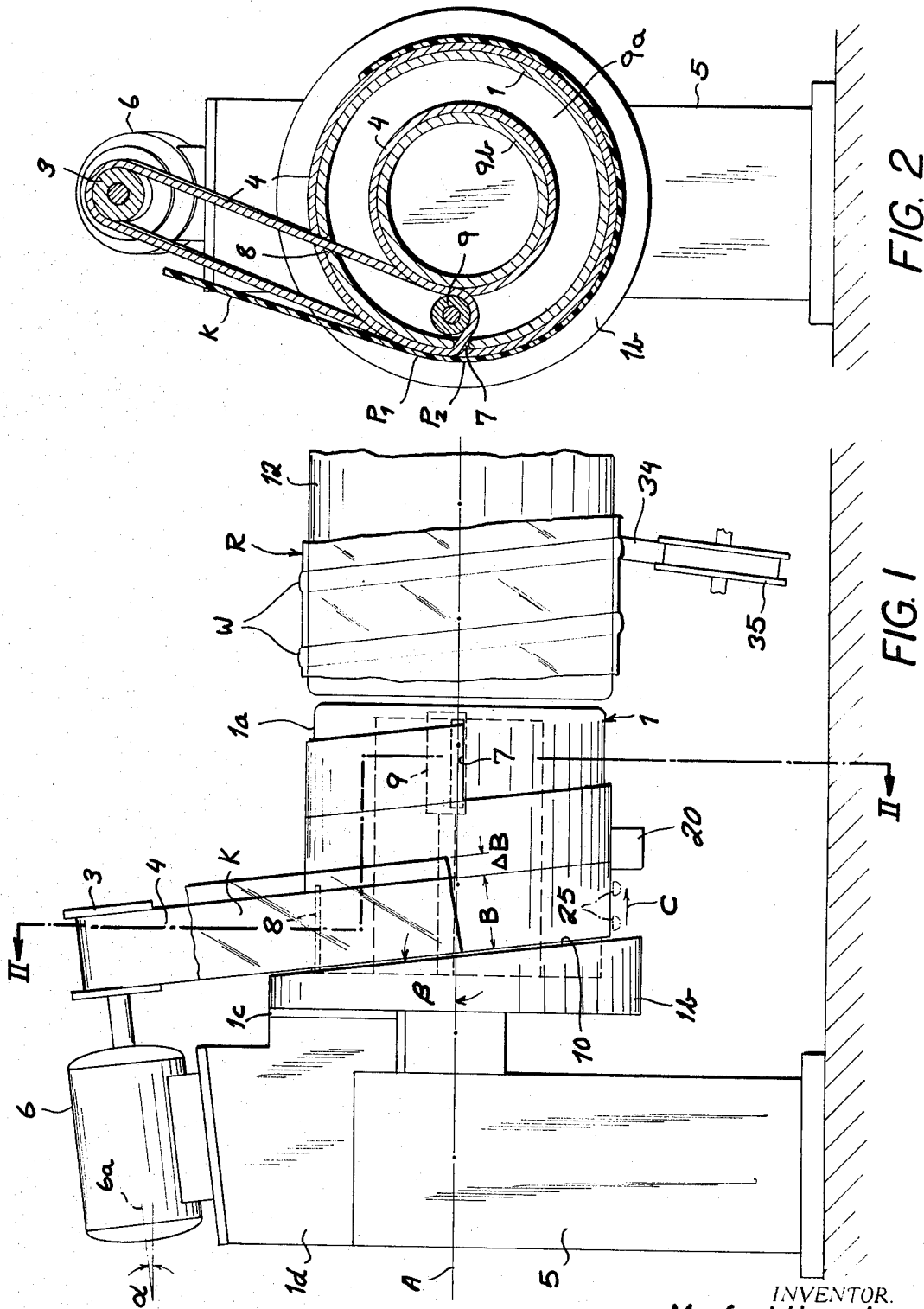

3,690,993
APPARATUS FOR MAKING HELICAL-SEAM TUBING FROM A SYNTHETIC-RESIN STRIP
Manfred Hawerkamp, 47 Altenrather Str., 521 Troisdorf, Germany
Filed June 12, 1970, Ser. No. 45,716
Claims priority, application Germany, June 12, 1969, P 19 29 926.4
Int. Cl. B31c 5/00
U.S. Cl. 156—429  8 Claims

ABSTRACT OF THE DISCLOSURE

An apparatus for forming helical-seam tubing in which an endless transport band passes over at least one helical turn along the periphery of a cylindrical mandrel to deposit and form a synthetic-resin band into helical configuration thereon. The transport band is deflected inwardly into the interior of the mandrel at an inlet slot and emerges at an outlet slot for return to a drive roller.

(1) Field of the invention

My present invention relates to an apparatus for making helical-seam tubing of synthetic resin and, more particularly, to the formation of flexible, rigid or semirigid hose or tubing from a synthetic-resin band coiled in a helical pattern.

(2) Background of the invention

It has been proposed heretofore to form flexible and even rigid hose and tubing of a synthetic-resin material by coiling a band of the synthetic resin, in a plastically deformable state (a plasticized resin or a heated thermoplastic) and to seam the turns together along their juxtaposed edges to constitute a fluid-tight tube from the coil body. In this application, reference to helical-seam or spiral-seam tubing is to be understood as including all tubular structures whether flexible or rigid, made by helically coiling a band of synthetic-resin material and forming a generally helical seam at adjoining edges of the successive turns.

Several systems and devices have been used for the formation such tubes and, for example, a conventional system may comprise a coiling mandrel, e.g. a cylindrical metallic core, and means for feeding the band generally tangentially to the surface or periphery of the mandrel at an angle to the axis thereof so that the successive turns are formed as the tubular body rotates on the mandrel and is advanced axially in the direction of attack of the band supply. A forming arrangement is provided to ensure that the synthetic-resin band hugs the periphery of the mandrel and assumes the shape thereof while transport means is used to advance the formed tube and the oncoming band in the axial direction. To avoid kinking and excessive stressing of the synthetic-resin band, the forming means may include an arrangement whereby one turn of the band is looped about the mandrel to receive a curvature approximating that of the mandrel periphery, the band being brought into contact with the mandrel only after this initial turn.

It has also been proposed to apply the synthetic resin band to the mandrel with the aid of a transport band so designed that interaction between the mandrel surface and the band is precluded until the synthetic-resin material has received the appropriate shape. In general, systems of the latter type made use of a synthetic-resin band, slightly wider than the transport strip and overhanging the latter in the region of the seam so that the overhanging region overlapped the adjoining turn and a lapping-type seam could be formed. In other arrangements, the transport strip serves as a pressing member for applying the synthetic-resin band to the surface of the mandrel.

Problems have been encountered in connection with such arrangements because of the frictional forces between the coiled tube and the mandrel which had to be overcome by the transport device. For this reason, prior-art arrangements for the coiling of synthetic-resin bands in strips or the like have not gained widespread use.

(3) Objects of the invention

It is the principal object of the present invention, therefore, to provide an improved apparatus for producing helically coiled tubing of synthetic-resin bands.

Another object of the invention is to provide a relatively inexpensive, simple and efficiently operating device for the coiling of synthetic-resin bands upon a mandrel and wherein disadvantages due to the frictional relationships of earlier systems are avoided.

(4) Summary of the invention

These objects are attained, in accordance with the principles of the present invention, with a system in which an endless transport band is interposed between the synthetic-resin strip and the mandrel surface upon which it is coiled, the endless transport band passing around the periphery of the mandrel through at least one full turn and being drawn away from the inner surface of the coil tube inwardly through an opening in the mandrel surface for return to the transport-band drive.

The invention provides, therefore, that the coiling mandrel is formed along its periphery with an inlet slot and an outlet slot for the transport band, the inlet slot serving to permit deflection of the latter away from the inner surface of the coiled strip, while the outlet slot permits return of the transport band to the periphery of the mandrel. The inlet and outlet slots, according to the invention, are spatially fixed while the transport band engages the outer periphery of the mandrel and thus limits frictional contact between the coiled thermoplastic band and the mandrel surface at least until the synthetic-resin band has been given the helical configuration necessary for the formation of helical-seam tubing.

According to another feature of this invention, the transport band has a width slightly less than that of the synthetic resin band which rides upon the outer periphery of the transport band, the band being temporarily united for joint movement through at least one turn or loop about the mandrel such that the overhanging portion or margin of the synthetic-resin band overlaps the previously formed turn, and a lap-type seam is produced. The temporary joint movement of the band ensures that no frictional stress is established at the interface between them.

The temporary connection of the transport band and the synthetic-resin band may be brought about, according to this invention, by providing an adhesive at the interface, preferably of the contact type, ensuring joint movement as the bands are wrapped about the mandrel and the synthetic resin band brought into hugging relationship with the transport band and the mandrel over at least one turn as previously noted. In addition, or alternatively, the interengagement of the band may be accomplished by pressure applied transversely to the band, e.g. between pressure rolls.

According to a more specific feature of this invention, return means is provided for permitting the transport band to move endlessly along the transport path. The return means may include at least one roller arrangement disposed externally of the mandrel and having a periphery disposed such that the transport band extends substantially tangentially to the periphery of the mandrel. The latter may be cylindrical and tubular, with at least one additional roller arrangement disposed therein between the inlet and outlet slots to afford a direction change and permit the transport band to pay out through the outlet at the same rate that it enters the inlet slot. The second roller arrangement may comprise a central cylindrical member along which the return stretch of the transport band is passed over at least one helical turn, and an idler wheel adjacent the cylindrical member and about which the transport band is looped as it passes through the inlet slot.

The cylindrical member, mandrel and roller have parallel axes, i.e. axes which are parallel to the aforementioned slots and to the generatrices of the mandrel and cylindrical member. Advantageously, the mandrel and the cylindrical member are coaxial while the idler roller rotates about an axis parallel to the axis of the cylindrical member and the mandrel and is disposed in the space between the outer surface of the cylindrical member and the inner surface of the tubular mandrel.

Still another feature of this invention resides in the provision of an inclined-plane guide means for the transport band, the guide means being formed as a shoulder in the mandrel and lying in a plane inclined to the axis of the mandrel in the direction of axial feed of the transport band.

In the system of the invention, the synthetic-resin band is free from any frictional contact with the mandrel during coiling and is likewise free from any frictional stress at the interface between it and the transport band. The transport band and the mandrel, moreover, may be constructed to minimize the frictional engagement therebetween. This may be accomplished by lubrication of the interface between the mandrel and the transport band, by the selection of low-friction material from the mandrel surface and the band (e.g. highly polished metal or low-friction plastic such as Teflon). It is also possible, in accordance with the principles of the present invention, to reduce the friction between transport band and mandrel by providing the mandrel, in the region between inlet and outlet slots, with a rotating collar and/or a roller system, the collar or roller system being driven about the axis in the direction of movement of the transport band.

Still another feature of this invention resides in the provision of means for providing reinforcements within the pipe or tube produced by coiling the synthetic-resin band. In one embodiment, the helical reinforcement may be fed to the mandrel and incorporated in the interior of the band, e.g. as described in application Ser. No. 516,839 of which application Ser. No. 844,698 is a division. Alternatively, or in addition, the reinforcing strand may be fed to the mandrel concurrently with the synthetic-resin band and formed into a helix thereof. It has been found to be advantageous, moreover, to mount the drive means for the endless transport band upon the mandrel and rotate the mandrel together with the drive means, thereby permitting the reinforcing strand to be wound about the helical seam tube as it is produced. At the discharge side of the coiling mandrel, I may provide a driven mandrel, the purpose of which is to apply the reinforcement.

It will be apparent that the system of the present invention has numerous advantages, including the acceleration of the formation of hydraulic seam tubing which no longer creates difficulties with respect to friction between the synthetic-resin band and the mandrel. Also, the system may be used for relatively thin synthetic-resin foils, for synthetic-resin tubes of large diameters and correspondingly high peripheral speeds, and for the high speed manufacture of helical-seam tubing of all diameters.

(5) Description of the drawings

The above and other objects, features and advantages of the present invention will become more readily apparent from the following description, reference being made to the accompanying drawing in which:

FIG. 1 is a diagrammatic side-elevational view, partly broken away, of an apparatus according to the present invention;

FIG. 2 is a cross section in the direction of the arrow II—II of FIG. 1;

FIG. 3 is a view similar to FIG. 1 but diagrammatically illustrating other aspects of the invention;

FIG. 4 is a diagrammatic perspective view showing another embodiment of the coiling mandrel according to the present invention; and FIG. 5 is a similar diagrammatic view representing a mandrel embodying the principles of the present invention.

(6) Specific description

In FIGS. 1 and 2 of the drawing, I show a system for the production of helical-seam tubing R which is provided by overlap seams or welds W by heat-sealing, ultrasonic fusion, adhesive bonding, or any other technique known for the bonding of synthetic-resin portions together. As can be seen in FIG. 1, the seam W extends generally helically along the otherwise tubular cylindrical body R. The seams or welds may be formed in the manner described in application Ser. No. 844,698 and the application mentioned therein. In its basic aspects, the apparatus comprises a mandrel 1, a device for feeding the synthetic-resin band to the mandrel, transport and shaping means represented diagrammatically at 20 in FIG. 1, and, if desired, an assembly for coiling a helical reinforcement about or in the helical-seam tube, a device of this nature being shown at 21 in FIG. 3.

The mandrel 1, as can be seen in FIG. 1, comprises a tubular body 1a, mounted in a support 1b fixed at 1c to a pedestal 1d carrying an electric motor 6. A post or stand 5 carries the entire assembly. The feel roll for the synthetic-resin band K has not been illustrated in FIG. 1 but is shown diagrammatically at 22 in FIG. 3. The device 2 for feeding the synthetic-resin band K to the mandrel 1 and the means for applying the synthetic-resin band in a substantially frictionless manner to the outer periphery of the mandrel, comprises a drive roll 3 operated by the motor 6 and serving to drive an endless transport band 4 which is looped around this roll 3. As illustrated in FIG. 1, moreover, the axis 6a of the motor 6 includes an angle $\alpha$ with the axis A of the coiling assembly so that the transport band 4 is fed into the periphery of the drum 1 at an angle $\beta$ which is the complement of the angle $\alpha$ so that $\alpha = 90° - \beta$.

The mandrel 1 is provided at spatially fixed locations along its periphery with the inlet slot 7, close to the downstream axial end of the mandrel and an outlet 8 close to the upstream end thereof, the slot extending generally parallel to the axis A and the generatrices of the coiling drum 1. The width of the slot of the mandrel should be sufficient to accommodate the width B of the transport band 4 with some clearance so as to minimize deterioration of the transport band and friction within the system. The transport band 4 is looped about the mandrel 1 through at least one complete turn (two turns being illustrated in the system of FIG. 1) from the point $P_1$ at which the forward path of the transport band 4 contacts the periphery of the drum 1 in the tangential direction. At a point $P_2$, close to the point $P_1$, in terms of angular offset, the transport band is deflected away from the periphery of the disk and thus the transport band loops the mandrel slightly more than two complete turns. At least one turn is required for the purposes of the present invention.

Upon passage of the transport band 4 through the inlet slot 7 of the mandrel, the band passes about a direction-change roller 9 within the interior of the mandrel, the direction-change roller 9 being journaled on an end disk 9a at the downstream side of the assembly.

The band thereafter is applied to the outer periphery of a further roller or drum 9b, the latter being of cylindrical configuration and coaxial with the drum 1. After passing at least one turn about the periphery of this drum in a helix running to the left in FIG. 1, the band passes tangentially through the slot 8 about the drive roller 3.

The synthetic-resin band K is applied to the outer surface of the transport band 4 and has a width $B+\Delta B$ so that the successive turns of the synthetic-resin foil overlap by the width $\Delta B$ of overhang of the foil relative to the transport band. At the left-hand side of the mandrel 1, I provide an inclined plane 10 constituting a guide for directing the band at the pitch angle $\beta$ as previously described. Various means may be shown to hold the transport band 4 and the synthetic-resin band K against relative slippage, including a pressure-sensitive adhesive applied to the interface. In addition or alternatively, a pair of pressure rollers such as shown at 23 may hold the band together and/or a ledge 24 may be provided to overhang the bands and hold them snugly against the mandrel. The means for forming the helical seam is represented at 20 as previously noted.

The means 20 for fusing the overlapping marginal portion $\Delta B$ of the thermoplastic band K to the previous turn may constitute a heat-sealing roller arrangement as described and illustrated, for example. in my copending application Ser. No. 844,698. In addition, a preformed helical reinforcement, profiled to fit over the cylindrical surface of the mandrel 1, may be continuously inserted as illustrated diagrammatically at 25 in the direction of arrow C by rotating the reinforcement so that it remains aligned with the helical seam. The latter may be deformed to correspond to the profile of the reinforcement as is also illustrated and described in the last-mentioned application. The reinforcement coil is then drawn off the mandrel continuously with the formation of the helical tube. It has already been mentioned that other methods known in the art may be used to form the helical seam. For example, the marginal portion $\Delta B$ may be coated along its inner surface with a cementitious material while the overlapped portion of the preceding turn is similarly coated or remains uncoated; in this case the seam-forming means 20 need only be a pressure roller. In another alternative, ultrasonic welding serves to form the helical seam and, in the latter case, the pressure roller 20 may be a sonotrode which is vibrated at an ultrasonic frequency.

It will also be apparent from FIG. 1, that, while the successive turns of the synthetic-resin band overlap to form the helical seam, the successive turns of the transport band 4 do not overlap but abut edgewise, i.e. are contiguous. The seam W may also be provided with reinforcement in the manner described in U.S. Pat. 2,731,070.

In FIG. 5, I have shown a modified construction of the mandrel 1 which provides between the inlet slot 26 and the outlet slot 27, a rotatable collar 28 which may be journaled in roller or ball bearings and is rotatable in the direction of arrow D. The collar may be shaped to correspond to the pitch of the transport band helix or may be cylindrical and can be rotatably entrained by a transport band or driven synchronously (i.e. at the same peripheral speed) with the band to minimize friction between the transport band and the mandrel. An alternative arrangement with a similar function is illustrated in FIG. 4, in which the mandrel 30 is shown to be made up of a multiplicity of angularly equispaced rollers 31 lying along generatrices of the cylindrical outline of the mandrel and defining its periphery. The rollers 31, between which the inlet and outlet slots are formed, may be driven synchronously with the band via a spur gear 32 and individual pinions 33 carried by these rollers. Each individual roller 31 is thus rotated in the direction of the arrow E while the gear 32 is rotated in the direction of arrow F.

In FIG. 1, I have also shown a drive mandrel 12 downstream of the coiling mandrel 1 for taking up the completed tube R and winding an additional reinforcement thereon. The reinforcement is illustrated at 34 and is paid off from a coil 35. The reinforcement 34 may be a tubular synthetic resin (see application Ser. No. 818,521) which is thermally or adhesively bonded or ultrasonically welded to the tube R.

FIG. 3 illustrates another system in which the reinforcing strip may be applied, in this case continuously. It may be noted, at this point, that the reinforcing strip 36 of FIG. 3 may be a flattened synthetic-resin tube, as previously discussed, or a solid synthetic-resin or metallic strand. In this embodiment, the motor 37, which drives the transport band 38 via the roller 39, is mounted on the mandrel 40 and hence is rotated therewith. Both mandrel and drive motor are therefore rotated about the axis of the mandrel to rotate the finished tube 41 at the same angular velocity and permit the strand 36 to be applied from a stationary supply spool 21.

The support 42 for the supply spool 22 of the thermoplastic band 43 is likewise mounted for rotation with the mandrel and, moreover, the rotatable structure may include a supply spool 44 feeding a reinforcement strand 45 through an eye 46 directly beneath the overlapped portion of the thermoplastic band and into the helical seam. The reinforcement 45 is deformed about the cylindrical surface of the mandrel with the assembly 47, e.g. roller arrangement, forming the electrical seam and rotatable with the mandrel as previously described. The mandrel 40 is mounted on a shaft 48 driven by the motor 50. In general, the motor 42 will operate to advance the transport and synthetic resin bands at a higher peripheral speed than the speed of the mandrel produced by motor 50 when the latter rotation is in the same sense as the advance of the thermoplastic band.

When the outer reinforcement is to be coiled in the opposite sense, the motor 50 drives the assembly in the direction opposite that of the advance of the thermoplastic band.

The improvement described and illustrated is believed to admit of many modifications within the ability of persons skilled in the art, all such modifications being considered within the spirit and scope of the invention except as limited by the appended claims.

I claim:

1. An apparatus for forming helical seam tubing, comprising:
    a mandrel having a generally annular periphery;
    transport means for feeding an endless transport band generally tangentially to said periphery, said transport band passing about said mandrel over at least one turn of a helix, said transport band engaging a synthetic-resin band overlying same to coil said synthetic-resin band into a helix;
    means for deflecting said transport band inwardly of the periphery of said mandrel and away from the inner surface of the tube formed upon the seaming of said synthetic-resin band, said mandrel being generally cylindrical and tubular and being provided along its periphery with an inlet slot and an outlet slot clearing said transport band and axially spaced by a distance equal to the axial extent of said at least one turn of said helix, said means for deflecting said transport band away from said inner surface of said tube being disposed at least in part within said mandrel; and
    at least one drive roller externally of said mandrel and looped by said transport band, said transport band running from said drive roller around the periphery of said mandrel, into the interior of said mandrel through said inlet slot and returning to said drive roller through said outlet slot.

2. An apparatus for forming helical seam tubing, comprising:

a mandrel having a generally annular periphery;

transport means for feeding an endless transport band generally tangentially to said periphery, said transport band passing about said mandrel over at least one turn of a helix, said transport band engaging a synthetic-resin band overlying same to coil said synthetic-resin band into a helix;

means for deflecting said transport band inwardly of the periphery of said mandrel and away from the inner surface of the tube formed upon the seaming of said synthetic-resin band, said mandrel being generally cylindrical and tubular and being provided along its periphery with an inlet slot and an outlet slot clearing said transport band and axially spaced by a distance equal to the axial extent of said one turn of said helix, said means for deflecting said transport band away from said inner surface of said tube being disposed at least in part within said mandrel; and at least one drive roller externally of said mandrel and looped by said transport band, said transport band running from said drive roller around the periphery of said mandrel, into the interior of said mandrel through said inlet slot and returning to said drive roller through said outlet slot, said means for deflecting said transport band including a central roller coaxial with said mandrel and received therein, said transport band passing around said central roller.

3. The apparatus defined in claim 2, further comprising an idler roller disposed within said mandrel between said central roller and said inlet slot and engaging said transport band.

4. The apparatus defined in claim 2 wherein said mandrel is formed with an inclined-plane guide surface for feeding said bands unto said periphery of said mandrel at an angle to the axis thereof and for positioning said synthetic-resin band upon said transport band.

5. The apparatus defined in claim 2 wherein said mandrel is formed with at least one rotating surface along said periphery for limiting friction between said transport band and said mandrel.

6. The apparatus defined in claim 2, further comprising a receiving mandrel downstream of the first-mentioned mandrel for accepting said tube, and means for applying a reinforcement to said tube.

7. The apparatus defined in claim 2 wherein said drive roller is formed with a motor and said drive roller and motor are rotatably mounted jointly with said mandrel, said apparatus further comprising means for rotating said mandrel, said drive motor and said roller and means for applying a reinforcement to said tube.

8. The apparatus defined in claim 2, further comprising means for applying a helical reinforcement to said tube.

References Cited
UNITED STATES PATENTS

| | | | |
|---|---|---|---|
| 3,533,883 | 10/1970 | Gartaganis et al. | 156—432 |
| 3,464,879 | 9/1969 | Poulsen | 156—429 X |
| 3,155,559 | 11/1964 | Hall | 93—80 X |
| 3,253,520 | 5/1966 | Cvacho | 93—80 |
| 3,185,049 | 5/1965 | Couzens | 93—80 |
| 3,548,724 | 12/1970 | Hall | 93—80 |
| 3,398,037 | 8/1968 | Elam et al. | 156—432 X |
| 3,532,580 | 10/1970 | Kanao | 156—432 |

BENJAMIN A. BORCHELT, Primary Examiner

H. J. TUDOR, Assistant Examiner